United States Patent
Ohki et al.

(10) Patent No.: US 6,270,611 B1
(45) Date of Patent: Aug. 7, 2001

(54) MULTI-LAYER RECORDING MEDIUM AND METHOD FOR PRODUCING SAME

(75) Inventors: Hiroshi Ohki, Kanagawa; Toshiyuki Kashiwagi; Motohiro Furuki, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/978,570

(22) Filed: Nov. 26, 1997

Related U.S. Application Data (62) Division of application No. 08/607,760, filed on Feb. 27, 1996, now Pat. No. 5,708,652.

(30) Foreign Application Priority Data

Feb. 28, 1995 (JP) .................................................. 7-040567
Aug. 29, 1995 (JP) .................................................. 7-220565

(51) Int. Cl.$^7$ ........................................................ B32B 31/12
(52) U.S. Cl. .................. 156/220; 156/273.3; 156/275.5; 156/306.9
(58) Field of Search ................................ 369/272, 286, 369/284, 275.1; 156/74, 209, 272.2, 273.7, 273.3, 221, 220, 275.5, 306.9; 428/908, 64.4; 264/1.9, 2.7, 1.7

(56) References Cited

U.S. PATENT DOCUMENTS

| | | | |
|---|---|---|---|
| 4,965,118 | * 10/1990 | Kodera et al. | 428/137 |
| 5,126,996 | *  6/1992 | Iida et al. | 369/283 |
| 5,188,863 | *  2/1993 | De Graaf et al. | 427/512 |
| 5,466,319 | * 11/1995 | Zagar et al. | 156/220 |
| 5,485,452 | *  1/1996 | Maeda | 369/284 |
| 5,540,966 | *  7/1996 | Hintz | 428/64.1 |

* cited by examiner

Primary Examiner—Michael W. Ball
Assistant Examiner—Gladys Piazza
(74) Attorney, Agent, or Firm—Ronald P. Kananen; Rader, Fishman & Grauer (57) ABSTRACT

A multi-layer recording medium including a light-transmitting substrate, a first information recording layer formed on the substrate, an intermediate layer at least part of which is formed of a photo-curable resin film, and which is formed on the first information recording layer, a second information recording layer formed on a surface of the intermediate layer opposite to the surface facing the first information signal layer, and a protective layer formed on the second information signal layer. A method for producing such multi-layer recording medium is also disclosed.

8 Claims, 6 Drawing Sheets

MULTI-LAYER RECORDING MEDIUM AND METHOD FOR PRODUCING SAME

This application is a divisional of application Ser. No. 08/607,760 filed Feb. 27, 1996 now U.S. Pat. No. 5,708,652.

BACKGROUND OF THE INVENTION

This invention relates to a multi-layer recording medium, such as a multi-layer optical disc, having plural information recording layers in which information signals are recorded by pits. The present invention also relates to a method for producing the multi-layer recording medium.

In a disc-shaped recording medium, for example, an optical disc or a magneto-optical disc, as a package medium for music or picture information or recording apparatus for computers, the recent tendency is towards higher recording density of information signals. For realizing this high density recording, there is proposed a multi-layer optical disc having a plurality of layered information recording layers functioning as a signal recording region.

Among a variety of multi-layer optical disc, there is a double-layer optical disc having two layered information recording layers functioning as an information recording region. Such double-layer optical disc 100, shown in FIG. 1, includes a disc substrate 101 of a transparent synthetic resin material, such as polycarbonate, on one surface of which is formed a first information recording layer 101a having rows of pits, and a semi-transparent thin reflecting film 102 of a dielectric material, such as silicon nitride SiN, formed on the first information recording layer 101a. The double-layer optical disc 100 also includes an intermediate layer 103 of a transparent resin material having, on the surface thereof opposite to the recording layer 101a, a second information recording layer 103a also having rows of pits, and a reflecting film 104 of, for example, A1, formed on the second information recording layer 103a. In addition, the double-layer optical disc includes a protective layer 105 formed on the reflective film 104.

Figure 1:
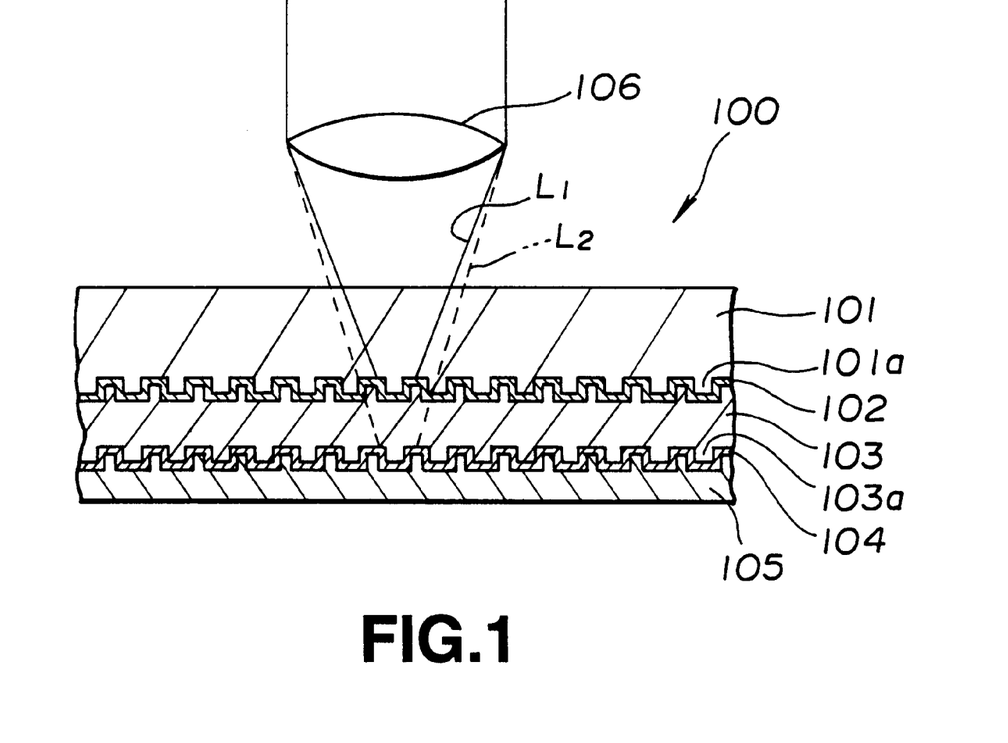
FIG. 1 is a schematic cross-sectional view showing a conventional double-layer optical disc.

For reading out the information signals from the double-layer optical disc, the focal position of a laser light radiated from an objective lens 106 of an optical pickup device shown in FIG. 1 is changed in two steps. That is, for reading out the information signals on the first information recording layer 101a, the spot of a laser light beam $L_1$ is located on the row of pits recorded on the first information recording layer 101a. For reading out the information signals on the second information recording layer 103a, the spot of a laser light beam $L_2$, shown by a broken line in FIG. 1, is located on the row of pits recorded on the second information recording layer 103a. If, in such case, it is desired to prohibit interference from being produced between the information recording layers 101a, 103a in the signal read-out or reproducing operation, it is necessary to set the thickness of the transparent intermediate layer 103 between the information recording layers to a larger value on the order of 30 to 60 $\mu$m, for example, 40 $\mu$m.

In such double-layer optical disc 100, the intermediate layer 103 is formed by any of the following two methods. The first method is to spin-coat a UV curable resin (UV resin). The second method is to apply the UV resin dropwise into a space defined between the layers 101 and 105 by a spacer having a thickness corresponding to the thickness of the intermediate layer 103 for pressure bonding and curing the intermediate layer from both side layers.

For spin-coating the UV resin for forming the intermediate layer, since the UV resin can be applied to a thickness only of 10 $\mu$m by one coating operation, the process of application followed by curing needs to be repeated e.g., four times, thus consuming much time in the production of the multi-layer optical disc. In addition, if spin-coating is repeated a number of times, the UV resin is dripped or turned round to the peripheral portion thus producing thickness variations in the intermediate layer to obstruct production of the high precision multi-layer disc.

With the second method of dripping the UV resin into the spacer and pressure bonding and curing the resin from both side layers, it is necessary to set the spacer in position, thus necessitating a time-consuming operation in the production of the multi-layer optical disc, as in the first method explained above. On the other hand, the UV resin tends to leak from the spacer thus obstructing the production of the high precision multi-layer disc.

SUMMARY OF THE INVENTION

It is therefore an object of the present invention to provide a multi-layer recording medium and a method for producing the multi-layer recording medium in which the distance between the information recording layers may be sufficiently increased and the information recording layers may be set to uniform thicknesses.

It is another object of the present invention to provide a multi-layer recording medium and a method for producing the multi-layer recording medium in which the recording medium may be produced in a shorter time with higher precision by simplifying the formation and prohibiting variations in thickness of the intermediate layer.

Basically, the multi-layer recording medium of the present invention is produced by interposing a photo-curable resin film between a substrate having formed thereon a first information recording layer and a master disc for transcription of a second information recording layer. The photo-curable resin film is pressure bonded to the substrate and the master disc, and the master disc is then peeled off for forming the intermediate layer.

In one aspect, the present invention provides a multi-layer recording medium including a light-transmitting substrate, a first information recording layer formed on the substrate, an intermediate layer at least part of which is formed of a photo-curable resin film, and which is formed on the first information recording layer, a second information recording layer formed on a surface of the intermediate layer opposite to the surface thereof facing the first information signal layer, and a protective layer formed on the second information signal layer.

In another aspect, the present invention provides a method for producing a multi-layer recording medium including the steps of pressure bonding a photo-curable resin film to a substrate having a first information recording layer formed thereon by a master disc for transcribing a pattern of micro-sized lands and recesses of a second information recording layer, photo-curing the photo-curable resin film by light irradiation, peeling off the master disc from the photo-curable resin film for forming an intermediate layer, forming the second information recording layer on the intermediate layer and forming a protective layer on the second information recording layer.

In yet another aspect, the present invention provides a method for producing a multi-layer recording medium including the steps of pressure bonding a photo-curable resin film to a substrate having a first information recording layer formed thereon, photo-curing said photo-curable resin film by light irradiation, interposing a liquid photo-curable resin between the photo-curable resin film and a master disc for transcription of a pattern of micro-sized lands and recesses of a second information recording layer and curing the liquid photo-curable resin by light irradiation; peeling off the master disc from the cured liquid photo-curable resin film for forming an intermediate layer, forming the second information recording layer on the intermediate layer and forming a protective layer on the second information recording layer.

With the above-described arrangement of the present invention, since the intermediate layer is formed between the information recording layer by the photo-curable resin film (dry photopolymer film) or the photo-curable film and the photo-curable resin layer by the 2P method, the intermediate film may be of a larger and uniform thickness.

With the method for producing the multi-layer recording medium according to the present invention, a photo-curable resin film is interposed between and bonded to a semi-transparent reflective film formed on the first information signal layer and a master disc for transcription of the second information signal layer. The photo-curable resin film is then irradiated with light and cured, after which the master disc is peeled off for forming the intermediate layer. Thus the present method of producing the double-layer optical disc simplifies the formation of the intermediate layer and suppresses its thickness fluctuations thus enabling the double-layer optical disc to be produced in a shorter time with higher precision.

With the methods for producing the multi-layer recording medium according to the present invention, since the 2P method for the liquid photo-curable resin layer is applied after photo-curing the photo-curable resin film, the protective sheet may be peeled off with good peeling performance with the photo-cured resin film being bonded to the substrate having the first information recording layer. In addition, the second micro-sized lands and recesses may be formed accurately and to high definition by the application of the 2P method.

EMBODIMENTS

The first embodiment is directed to a double-layer optical disc 10 having two information recording layers functioning as an information signal recording region and carrying rows of pits or data in the form of micro-sized lands and recesses.

Figure 2:
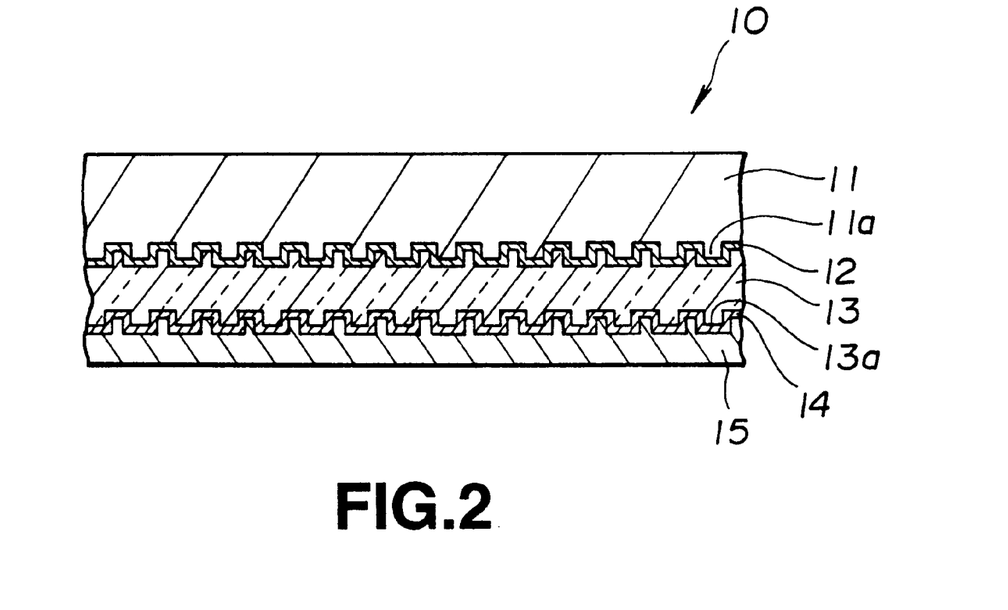
FIG. 2 is a schematic cross-sectional view showing an embodiment of a multi-layer recording medium according to the present invention.

Referring to FIG. 2, the double-layer optical disc 10 includes a disc substrate 11 of a transparent synthetic resin material, such as polycarbonate, on the major surface of which a first information recording layer 11a is formed by rows of pits, and a thin semi-transparent reflecting film 12 of a dielectric material, such as silicon nitride SiN, formed on the first information recording layer 11a. The double-layer optical disc 10 also includes an intermediate layer 13, 40 $\mu$m in thickness having, on its surface opposite to the semi-transparent reflecting film 12, a second information recording layer 13a having rows of pits, and a reflecting film 14 of, for example, Al, formed on the second information recording layer 13a. In addition, the double-layer optical disc 10 includes a protective layer 15 formed on the reflecting film 14.

The intermediate layer 13 is a transparent photo-curable resin film, that is, it is formed of a so-called film-forming dry photopolymer. An example of the film-forming dry photopolymer is one manufactured and sold by Du Pont under the trade name of "SURPHEX". This film-forming dry photopolymer is softened at, for example, 70° C. to 80° C. and pressed against a mold, after which it is irradiated with UV rays so as to be cured to the shape of the mold. The intermediate layer 13 of the double-layer optical disc 10 is generally required to be of a uniform thickness of 40 $\mu$m. Heretofore, preparation of the intermediate layer was time-consuming since the UV resin is repeatedly spin-coated to form an intermediate layer or dripped into a spacer after which it is pressure bonded in situ and cured to form the intermediate layer. The formation of the intermediate layer 13 is not time-consuming since the layer 13 is of a uniform thickness from the outset and is formed by pressure bonding the film-forming dry photopolymer in situ.

The method for producing the double-layer optical disc 10 is now explained.

The method includes a step of forming the disc substrate 11 carrying the first information recording layer 11a, and a step of forming the semi-transparent reflecting film 12 on the first information recording layer 11a of the disc substrate 11 formed by the substrate forming step. The method also includes a step of forming the intermediate layer 13 by interposing the film-forming dry photopolymer between the semi-transparent reflecting film 12 formed on the first information recording layer 11a and a master disc for transcribing the second information recording layer 13a, pressure bonding the photopolymer in situ, irradiating the film-forming dry photopolymer with light for curing the polymer and peeling off the master disc for forming the intermediate layer 13.

Before proceeding to description of the respective steps of the production method, the method for producing a master disc 20 for preparation of the disc substrate 11 and a master disc 21 for preparation of the second information recording layer 13a will be explained.

Figure 3A:
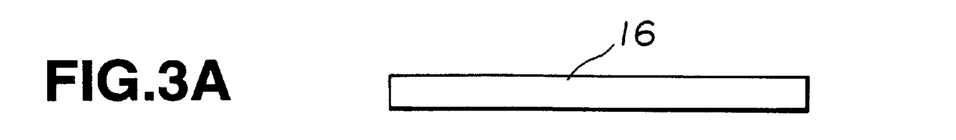
FIGS. 3A to 3G illustrate the method for producing master disc for preparation of a disc substrate for preparation of the recording medium shown in FIG. 2.
Figure 3B:
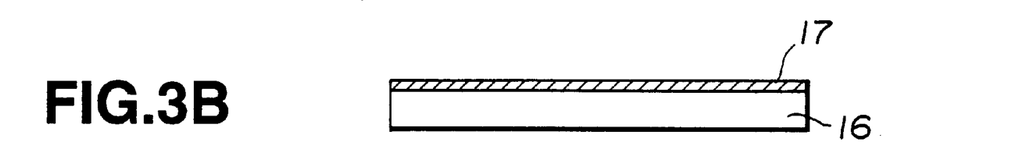
Figure 3C:
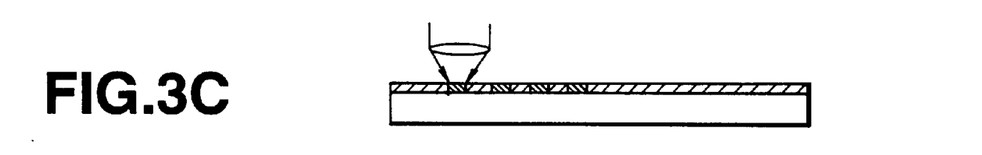

For preparing the master discs 20, 21, a resist 17 is coated as shown in FIG. 3B on a glass master disc 16 shown in FIG. 3A, and is irradiated with laser light rays as shown in FIG.

Figure 3D:
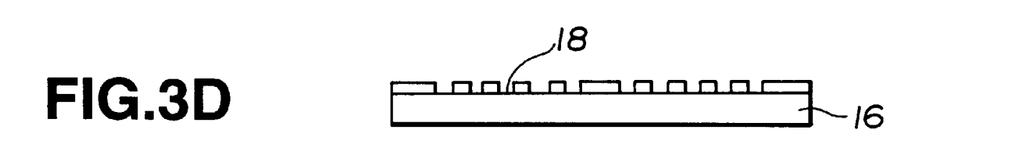
Figure 3E:
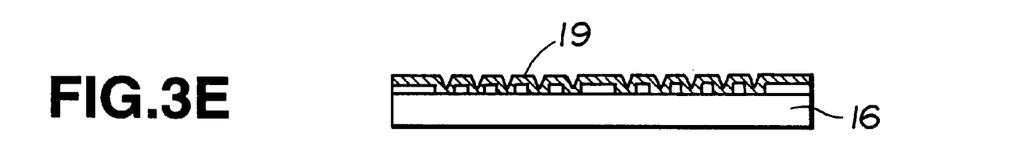
Figure 3F:
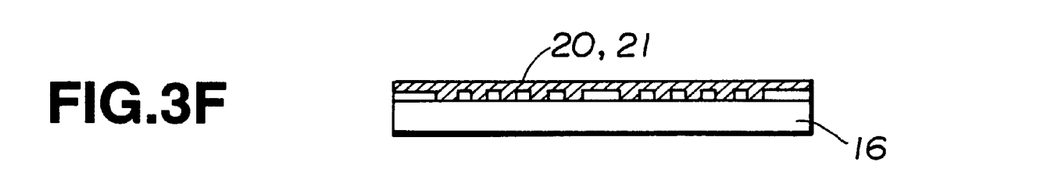
Figure 3G:
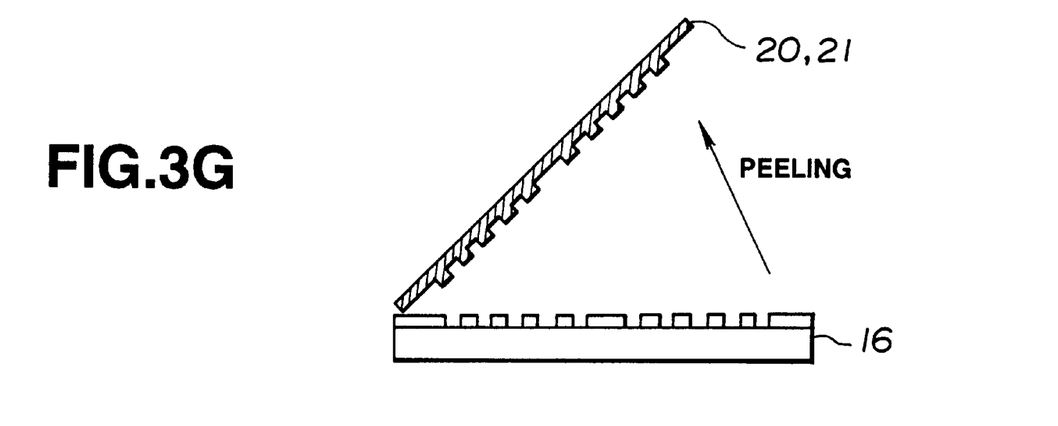

3C. The glass master disc is developed as shown in FIG. 3D for forming pits 18 by molding. The master glass disc, carrying the pits 18, is plated by electro-less plating, as shown in FIG. 3E, for forming a thin electrically conductive film 19. The glass master discs are completed by electroplating the resulting assembly as shown in FIG. 3F. The master discs 20, 21 are peeled off from the glass master disc 16 as shown in FIG. 3G. The master disc 20, thus prepared, is employed for molding a substrate.

Figure 4A:
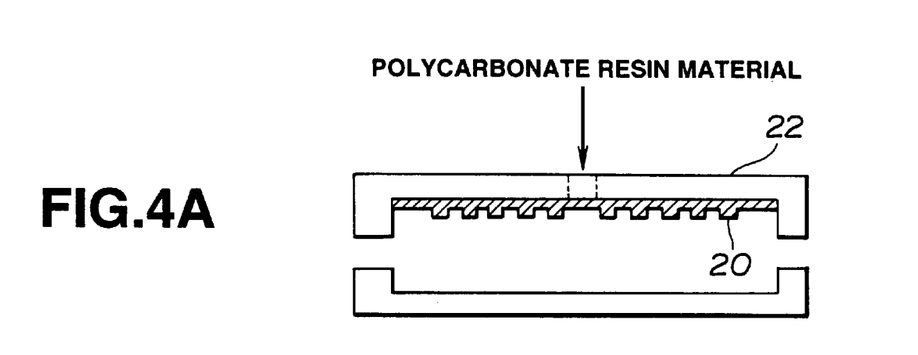
FIGS. 4A to 4C illustrate a step for forming a substrate and a step of forming a semi-transparent reflecting film for preparation of the recording medium shown in FIG. 2.
Figure 4B:
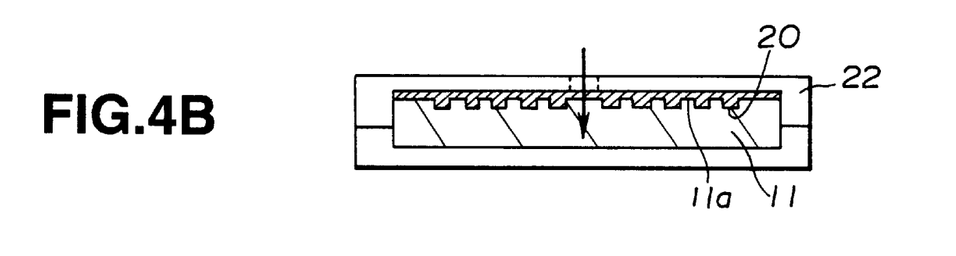

First, the master disc 20, functioning as a stamper, is set in a molding unit 22, into which a polycarbonate resin material, melted at a high temperature, is introduced, as shown in FIG. 4A. The resin material is compression-molded for molding the disc substrate 11, to which the first information recording layer 11*a* has been transcribed, as shown in FIG. 4B.

Figure 4C:
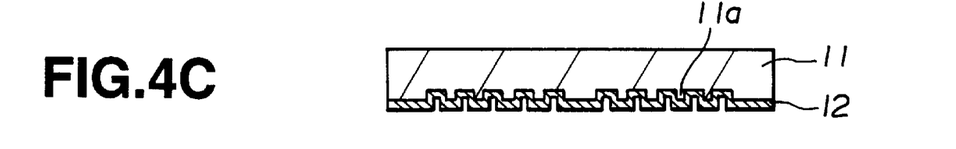

The semi-transparent thin reflective film 12, formed of, for example, silicon nitride SiN, is formed by sputtering on the first information recording layer 11*a*, as shown in FIG. 4C. This semi-transparent thin reflective film 12 reflects 20 to 40% of the laser light, with a wavelength of 632 nm, generated by an He—Ne laser, while transmitting 50 to 80% of the same laser light.

Figure 5A:
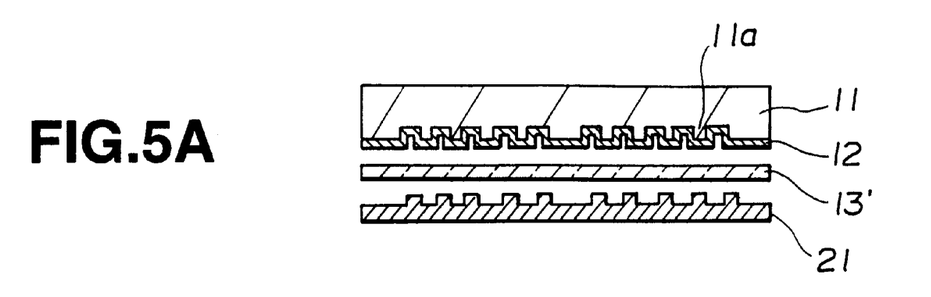
FIGS. 5A to 5D illustrate a step for forming an intermediate layer for preparation of the recording medium shown in FIG. 2.
Figure 5B:
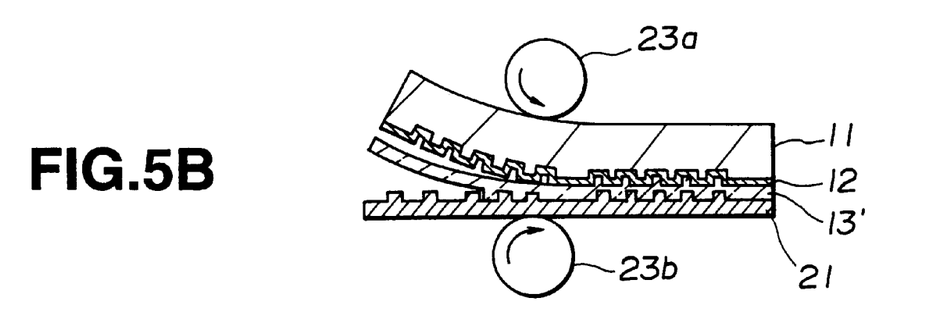
Figure 5C:
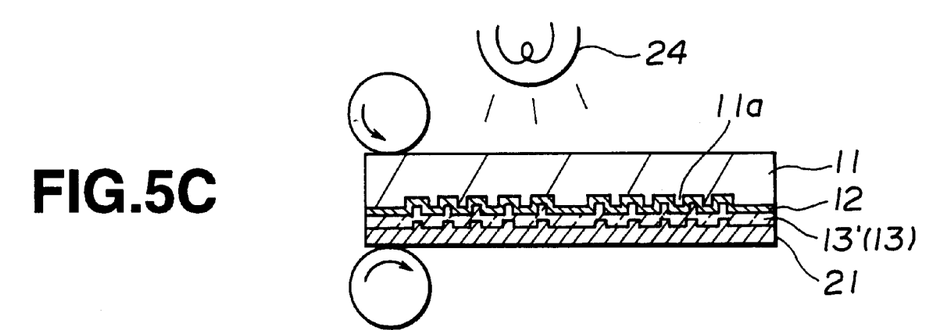
Figure 5D:
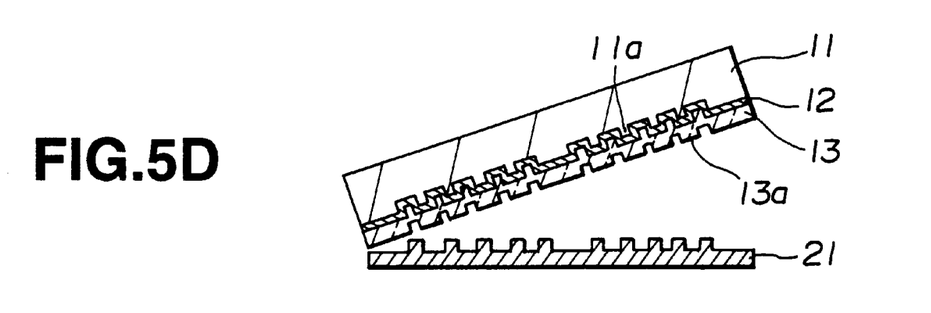

A film-forming dry photopolymer 13' is then interposed between the semi-transparent reflective film 12 formed on the first information recording layer 11*a* and the master disc 21. Film-forming dry photopolymer 13' is designed for transcription of the second information recording layer 13*a*. The film-forming dry photopolymer 13' is of a uniform thickness of, for example, 40 μm. This film-forming dry photopolymer 13' is inserted as shown in FIG. 5A after being heated to, for example, 70° C. The film-forming dry photopolymer 13', interposed between the semi-transparent reflective film 12 and the master disc 21, has both of its surfaces pressed between the master disc 21 and the semi-transparent reflecting film 12 of the disc substrate 11 by pressure rolls 23*a* and 23*b*, as shown in FIG. 5B. The film-forming dry photopolymer 13', having its both surfaces pressure-bonded to the master disc 21 and the semi-transparent film 12 by rotation of the pressure rolls 23*a* and 23*b*, is cured by irradiation of UV rays from a UV lamp 24, as shown in FIG. 5C, to form the intermediate layer 13. After formation of the intermediate layer 13, the master disc 21 is peeled off, as shown in FIG. 5D. After peeling of the master disc 21, the second information recording layer 13*a* has been transcribed on the intermediate layer 13.

On the second information recording layer 13*a*, the reflective film 14 of aluminum Al, reflecting 80% of the laser light from the He—Ne laser, as shown in FIG. 2, is formed by sputtering. On the reflective film 14 is formed the protective film 15 as shown in FIG. 2.

As described above, the double-layer optical disc 10 is formed by forming the intermediate layer 13 by interposing the film-forming dry photopolymer 13' of a uniform thickness between the semi-transparent reflective film 12 of the disc substrate 11 and the master disc 21 and pressure bonding the photopolymer 13' to the semi-transparent reflective film 12 of the disc substrate 11 and to the master disc 21 by the pressure rolls 23*a*, 23*b*, as shown in FIGS. 5A to 5D. Thus the present method of producing the double-layer optical disc 10 simplifies the formation of the intermediate layer 13 and suppresses its thickness fluctuations thus enabling the double-layer optical disc 10 to be produced in a shorter time with higher precision.

Although the present embodiment is directed to the double-layer optical disc 10, an optical disc of three or more layers may be easily produced by repeating the transfer of the semitransparent reflective film 12 and the film-forming dry photopolymer 13' a desired number of times.

Figure 6:
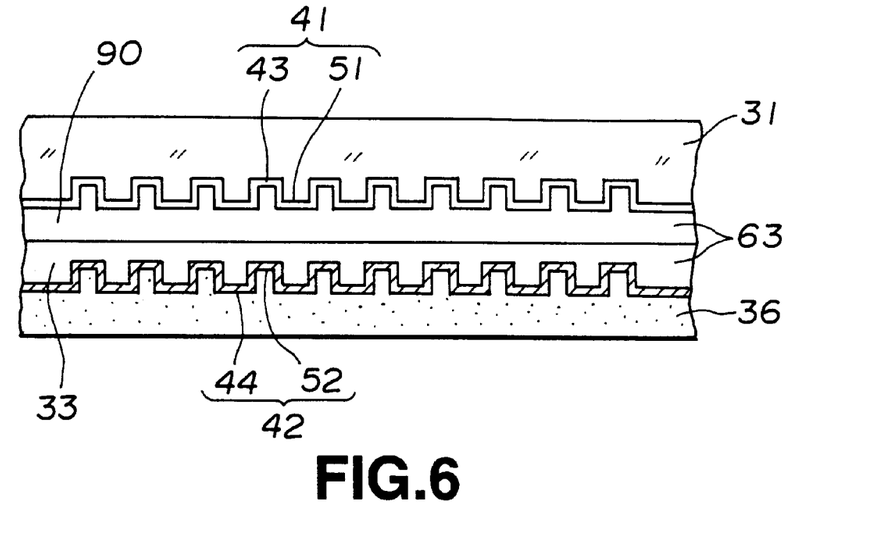
FIG. 6 is a schematic cross-sectional view showing another embodiment of a multi-layer recording medium according to the present invention.

FIG. 6 shows, in a schematic cross-section, a modification of the present invention in which first and second information recording layers 41, 42, respectively carrying first and second micro-sized lands and recesses 51 and 52, such as recording pits or tracking pre-grooves for information data, are layered with the interposition of a transparent intermediate film 63 in-between. The transparent intermediate film 63 is formed by a transparent transferable photo-curable resin film 90 and a cured (hardened) layer of liquid photo-curable resin 33. The transparent transferable photo-curable resin film 90 is formed so as to fill recessed portions of the first micro-sized lands and recesses 51.

Figure 7:
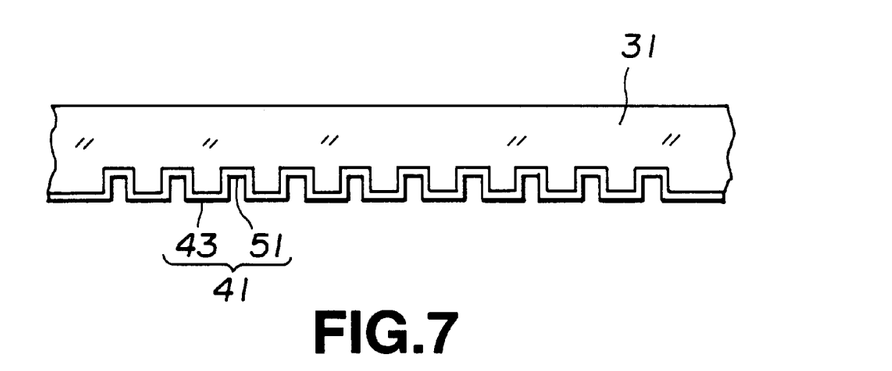
FIG. 7 is a schematic cross-sectional view of a substrate on which is formed a first information recording layer of a multilayer recording medium according to the present invention.

In this case, a transparent substrate 31, having formed on one of its major surfaces first micro-sized lands and recesses 51, such as recording pits for the data information and a pre-groove for tracking, is provided, as shown in FIG. 7. This transparent substrate 31 is formed by injection molding of, for example, polycarbonate (PC). On these micro-sized lands and recesses 51 is deposited a semi-transparent film 43 of, for example, SiN.

Figure 8:
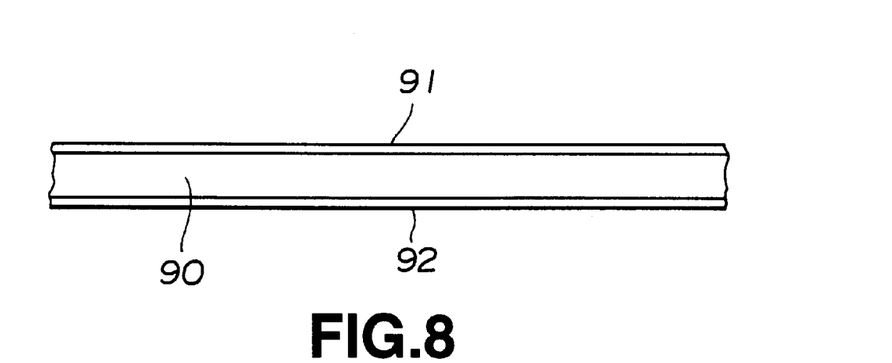
FIG. 8 is a schematic cross-sectional view of a transfer photo-curable resin film employed in the method for producing the multi-layer recording medium according to the present invention.
Figure 9A:
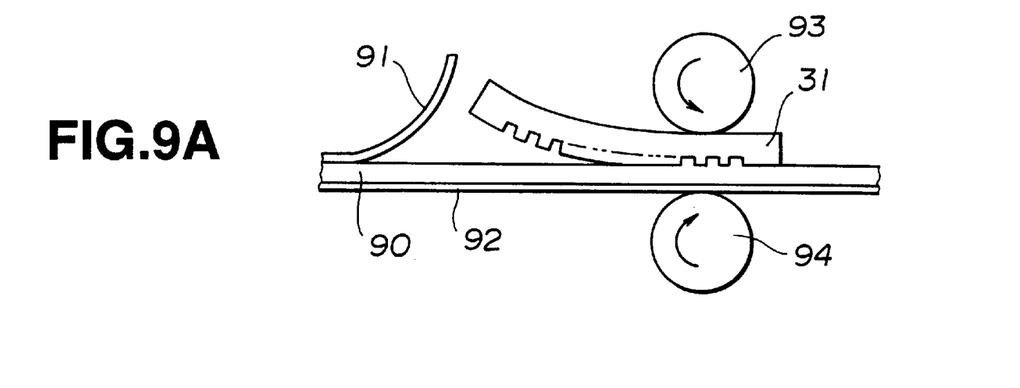
FIGS. 9A to 9D are schematic cross-sectional view for illustrating, step-by-step, the production process for producing the multi-layer recording medium shown in FIG. 6.

The transparent transferable photo-curable resin film 90, that is a film-forming dry photopolymer manufactured by Du Pont under the trade name of "SURPHEX", is provided, as shown in FIG. 8. This film-forming dry photopolymer 90 has both its surfaces coated with peelable protective sheets 91, 92. Referring to FIG. 9A, one of the protective sheets 91 is now peeled to expose a surface of the film 90, which is then abutted against the first information recording layer 41 of the substrate 31. The resulting assembly is introduced into a space between pressure rolls 93 and 94 and softened at a temperature of, for example, 70° C. to 80° C. for pressure bonding the film 90 to the substrate 31.

Figure 9B:
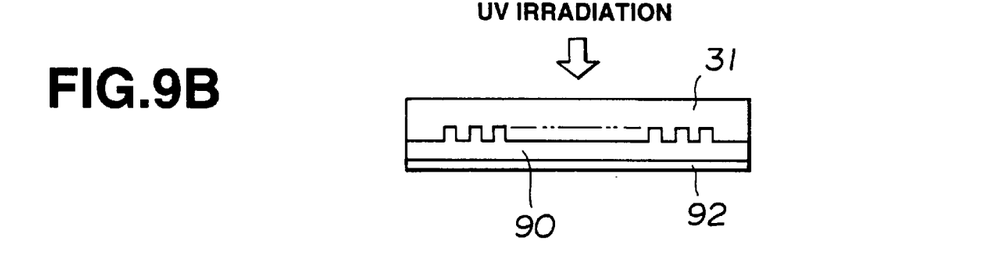

With the remaining protective sheet 92 deposited on the film 90, UV rays are radiated from the side of the transparent substrate 31 for curing the transparent transferable photo-curable resin film, that is the film-forming dry photopolymer 90, as shown in FIG. 9B.

Figure 9C:
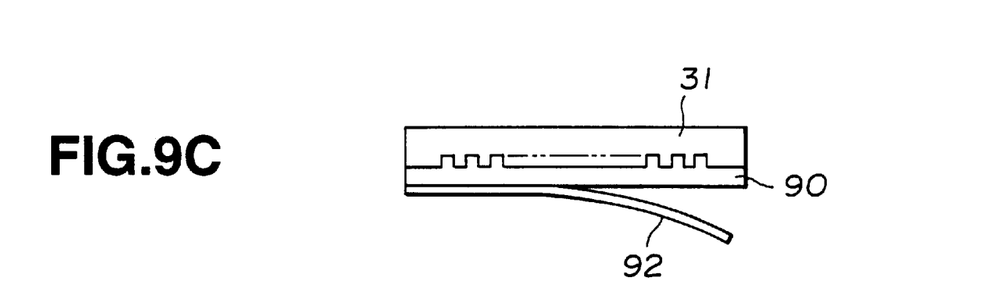

The protective sheet 92 of the film 90 is then peeled off, as shown in FIG. 9C. Since the film 90 has been cured by exposure to light, the protective sheet 92 is peeled off satisfactorily, with the film 90 remaining tightly bonded to the first information recording layer 41 of the substrate 31.

Figure 9D:
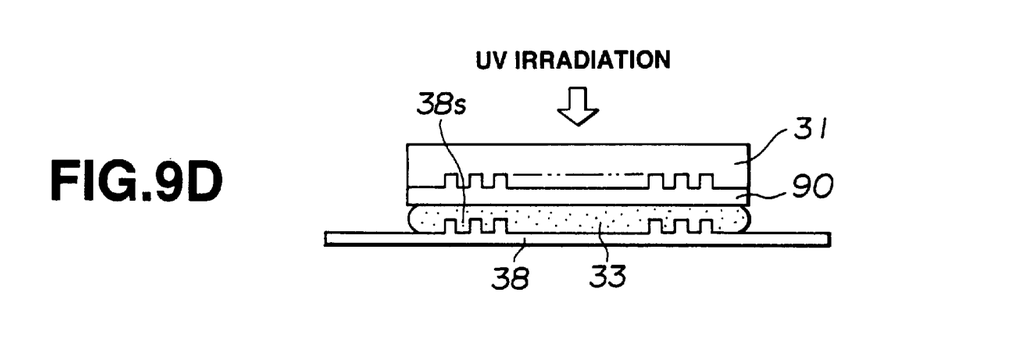

The second information recording layer 42 is formed by the 2P method on the substrate 31 having a planar surface by the transparent transferable photo-curable resin film 90 buried in the first micro-sized lands and recesses 51. To this end, the side of the substrate 31 having the film 90 is abutted against and bonded under pressure to a stamper 38 via a liquid photo-curable resin 33 such as UV curable resin manufactured by NIPPON GOSEI GUM CO., LTD. under the trade name of R6021, so that the pattern of micro-sized lands and recesses of the stamper 38 is transcribed to the liquid photo-curable resin 33 for forming the second micro-sized lands and recesses 52 therein as shown in the schematic cross-sectional view of FIG. 9D. The UV rays are irradiated from the side of the substrate 31 for curing the liquid photo-curable resin 33.

The stamper 38 is then peeled off. This transcribes the pattern of the micro-sized lands and recesses on the stamper 38 to form the second micro-sized lands and recesses 52. Referring to FIG. 6, there is formed on the surface of the substrate 31 having the second micro-sized lands and recesses 52 a reflective film 44, such as an Al vapordeposited film, for forming the second information recording layer 42. A reflective film 44 is deposited on the second information recording layer 42. In this manner, the first and second information recording layers 41 and 42 are layered, while the transparent intermediate film 63 is formed by cured layers of the transparent transferable photo-curable resin film 90 and the liquid photo-curable resin 33.

The reflective film 44 of, for example, Al, is then formed on the second micro-sized lands and recesses 52, and a protective film of, for example, UV curable resin, is formed thereon for producing the ultimate double-layer optical disc, that is a multi-layer optical recording medium.

Since the multi-layer optical recording medium according to the present invention is produced by layering the transparent transferable photo-curable resin film 90 and the liquid photo-curable resin 33, produced by the 2P method, the distance between the first and second information recording layers 41 and 42 may be set to a larger value of, for example, 30 to 60 μm, such as 40 μm. Basically, the transparent intermediate film 63 may be set to a uniform thickness since the transparent transferable photo-curable resin film 90 employed has a pre-set constant thickness.

The second micro-sized lands and recesses 52 may be reliably and accurately formed by applying the 2P method in forming the second information recording layer 42, so that a multi-layer, herein double-layer optical recording medium, having superior optical characteristics, may be produced.

In the above-described embodiments, the optical disc having two information recording layers is produced. However, the present invention may also be applied to a multi-layer optical recording medium having three or more information recording layers, or to a multi-layer optical recording medium having plural information recording layers, such as photomagnetic recording layers or phase transition recording layers having micro-sized lands and recesses, other than the optical disc.

Also, in the above-described embodiments, the first micro-sized lands and recesses 51 of the first information recording layer 41 are formed by injection molding simultaneously with the molding of the substrate 31. However, the first micro-sized lands and recesses 51 may also be formed by, for example, the 2P method. In the above-described method of the present invention, irradiation of the liquid photo-curable resin 33 with photo-curing light is through the substrate 31 and the as-cured transparent transferable photo-curable resin film 90, the substrate 31 is formed by a transparent substrate having high transmittance with respect to this wavelength light, for example, UV rays, such as the light having the wavelength of 365 nm (i-rays). The transparent transferable photo-curable resin film 90 may be designed so that its spectral properties are changed after curing from those prior to curing such that the as-cured polymer exhibits high transmittance with respect to UV rays. An insulator may also be added which will raise photosensitivity with respect to the light transmitted through the transparent transferable photo-curable resin film.

In the multi-layer recording medium of the above-described embodiments, the substrate 31 and the transparent intermediate film 63 exhibits high transmittance with respect to the semiconductor laser light used for recording or reproduction of the information signals for the recording medium, while the semi-transparent film 43 has optical properties of partially reflecting and partially transmitting the similar light.

The foregoing description has been made with reference to a ROM type double-layer optical disc in which the first and second information recording layers, each having micro-sized lands and recesses, such as information data recording pits or tracking pre-grooves, are layered with the interposition of the transparent intermediate film in-between. The present invention, however, is not limited to the optical disc. On the contrary, the present invention may be applied to a variety of optical recording media, such as magneto-optical discs, phase-transition optical discs, or card- or sheet-shaped recording media, other than the optical disc, in which two or more information recording layers having micro-sized lands and recesses are layered with the interposition of the transparent intermediate film.

What is claimed is:

1. A method for producing a multi-layer recording medium comprising the steps of:
   pressure bonding a photo-curable resin film to a substrate having a first information recording layer formed thereon;
   photo-curing said photo-curable resin film by light irradiation;
   interposing a liquid photo-curable resin between said photo-curable resin film and a master disc;
   peeling off the master disc from the liquid photo-curable resin thereby forming an intermediate layer and a second information recording layer on said intermediate layer;
   sputtering a reflective film on said second information layer; and
   forming a protective layer on said reflective film.

2. A method for producing a multi-layer recording medium as described in claim 1, wherein:
   said recording medium is comprised of at least three information recording layers, where said at least three information recording layers are separated by at least two intermediate layers.

3. A method for producing a multi-layer recording medium as described in claim 1, wherein:
   said photo-curable resin film, after photo-curing, exhibits high transmittance with respect to UV rays.

4. A method for producing a multi-layer recording medium as described in claim 1, wherein:
   said photo-curable resin film having an insulator, for raising photosensitivity to light transmitted through said photo-curable resin film.

5. A method for producing a multi-layer recording medium comprising the steps of:
   forming a first information recording layer on a substrate by a first master disc;
   bonding a photo-curable resin film to said substrate by pressing between pressure rollers;
   photo-curing said photo-curable resin film by light irradiation;
   interposing a liquid photo-curable resin between said photo-curable resin film and a second master disc;
   curing said liquid photo-curable resin by light irradiation thereby forming an intermediate layer;
   peeling off said second master disc from said cured liquid photo-curable resin; thereby
   transcribing a second information recording layer onto said intermediate layer;
   sputtering a reflective film on said second information layer; and
   forming a protective layer on said reflective film.

6. A method for producing a multi-layer recording medium as described in claim 5, wherein:

said recording medium is comprised of at least three information recording layers, where said at least three information recording layers are separated by at least two intermediate layers.

7. A method for producing a multi-layer recording medium as described in claim 5, wherein:

said photo-curable resin film, after photo-curing, exhibits high transmittance with respect to UV rays.

8. A method for producing a multi-layer recording medium as described in claim 5, wherein:

said photo-curable resin film having an insulator, for raising photosensitivity to light transmitted through said photo-curable resin film.

* * * * *